(12) United States Patent
Earnshaw et al.

(10) Patent No.: US 7,058,085 B2
(45) Date of Patent: Jun. 6, 2006

(54) METHOD AND APPARATUS FOR TRANSMITTING DATA OVER A NETWORK WITHIN A SPECIFIED TIME LIMIT

(75) Inventors: Mark Earnshaw, Nepean (CA); Yoon Chae Cheong, Kanata (CA); Wei Huang, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 998 days.

(21) Appl. No.: 09/805,958

(22) Filed: Mar. 14, 2001

(65) Prior Publication Data

US 2003/0012212 A1 Jan. 16, 2003

(51) Int. Cl.
*H04J 3/24* (2006.01)
(52) U.S. Cl. ...................................... 370/473
(58) Field of Classification Search ................ 370/235, 370/236, 231, 242–245
See application file for complete search history.

(56) References Cited

U.S. PATENT DOCUMENTS

| 6,021,124 | A * | 2/2000 | Haartsen ..................... 370/336 |
| 6,330,435 | B1 * | 12/2001 | Lazraq et al. ............. 455/412.1 |
| 6,621,796 | B1 * | 9/2003 | Miklos ........................ 370/236 |
| 6,629,285 | B1 * | 9/2003 | Gerendai et al. ........... 714/748 |

* cited by examiner

Primary Examiner—Hanh Nguyen
Assistant Examiner—Thai Hoang
(74) Attorney, Agent, or Firm—Dennis R. Haszko; Jeffrey M. Measures; Borden Ladner Gervais LLP (57) ABSTRACT

A radio link protocol for a communications system ensures that delivery of Internet protocol data packets occurs within a set delay bound for the packets, in order to satisfy specified quality of service levels. Data packets arriving at a transmitter are subdivided into data blocks. As each block is transmitted, the transmitter starts an associated acknowledgement timer. The timer is turned off, before it expires, if the transmitter timely receives from a receiver a message informing the transmitter that the associated block was successfully received. If such message is not received, the timer expires and the transmitter sends an acknowledgement request signal to the receiver and starts an associated panic timer. The panic timer is turned off, before it expires, if the transmitter subsequently timely receives a message that the associated block was successfully received. If such message not received, the panic timer expires and the transmitter sends one of more copies of the corresponding block to the receiver before occurrence of the delay bound. If the transmitter receives a negative acknowledgement message from the receiver, that a block is missing or corrupted, the transmitter retransmits a copy of the block to the receiver. To reduce messaging traffic, the transmitter cancels acknowledgement and panic timers based upon information contained in negative acknowledgement messages, and the receiver can periodically send acknowledgement messages to inform the transmitter of successfully received blocks.

70 Claims, 6 Drawing Sheets

METHOD AND APPARATUS FOR TRANSMITTING DATA OVER A NETWORK WITHIN A SPECIFIED TIME LIMIT

FIELD OF THE INVENTION

The present invention relates generally to transmitting data, and in particular relates to a protocol for ensuring on-time delivery of data in a communications network.

BACKGROUND OF THE INVENTION

A wireless communications environment is quite harsh on the transmission of data when compared to a wire-line network. Factors such as Rayleigh fading, shadowing and the distance between transmitter and receiver can affect received radio signal strength and, hence, the quality or integrity of information being communicated. Many forms of data communication require extremely low error rates for accuracy. One way to achieve this over a wireless link is by increasing transmitted signal strength to reduce the effects of interference. However, this places a greater strain on a transmitter's power source (which leads to reduced battery life in the case of a mobile terminal) and increases interference with other users in the system, which in turn reduces overall system capacity.

Another approach to achieve low data error rates is to identify and retransmit any subsets of data that are in error or missing. This can be accomplished at different levels within the network. For example, TCP (Transmission Control Protocol) can be used to control a flow of IP (Internet Protocol) data packets at the network layer of the system. TCP is used at both a transmitter and receiver to determine if any IP data packets have been lost or received in error, and any such packets are retransmitted. However, TCP is designed primarily for wire-line networks, which generally have much lower probabilities of error than do wireless systems. The error rates normally encountered within a typical wireless connection would therefore cause TCP to be extremely inefficient in terms of its data throughput, i.e., in terms of the average amount of data that can be transmitted per unit time. In wireless systems, a protocol called RLP (Radio Link Protocol) is therefore customarily used at a lower network layer, the MAC (Media Access Control) layer, to increase the reliability of the wireless connection.

RLP functions by dividing large sets of data, e.g. an IP packet, into shorter units or blocks that are then transmitted across the wireless link. Each block has a sequence number and a CRC (Cyclical Redundancy Check) value associated with it. The sequence numbers are used to reassemble the RLP blocks at the receive end in the correct order and to identify any blocks that are missing and need to be retransmitted. The CRC value is a checksum used to determine whether or not each RLP block, as received, is correct or corrupted. The receiver checks the sequence numbers and the CRC values of the received RLP blocks and requests retransmission of only those blocks that are missing or corrupted. This results in a significant reduction in the visible error rate.

The desired error rate for a particular multimedia service can be used to determine the maximum number of retransmission attempts that will be made by the RLP. However, it also is desirable that the RLP, on a best-effort basis, provide a maximum allowable transmission delay for all data packets being sent. This maximum allowable transmission delay can be implemented by a delay bound for each data packet, which represents the time by which a transmitted packet must be present at the receiver, or else its associated QoS (Quality of Service) criteria will have been violated. The delay bound value will depend upon the type of service being offered and on the desired level of service, since some applications may require a shorter delay bound than others. Associating a delay bound with each IP packet being processed allows the transmitter to prioritize data packets appropriately in a packet-switched system.

A standard RLP algorithm in use today is called RLP III. This is an NAK (Negative AcKnowledgement) based algorithm with a fixed retransmission pattern. A receiver sends an NAK message to a transmitter whenever the receiver determines that it is missing one or more RLP blocks or that a block is corrupted. If a received RLP block has a higher sequence number than the receiver is expecting, it is known that one or more intervening RLP blocks have been lost in transit. In this situation, the receiver sends to the transmitter two NAK messages containing the sequence number of the missing RLP block, since sending an NAK message multiple times increases the probability that the transmitter will correctly receive at least one. If a copy of the missing block is not then received from the transmitter within a certain time-out period, three NAK messages are sent to the transmitter. If a copy of the missing block is still not received, then the RLP abandons retransmission attempts.

Figure 1:
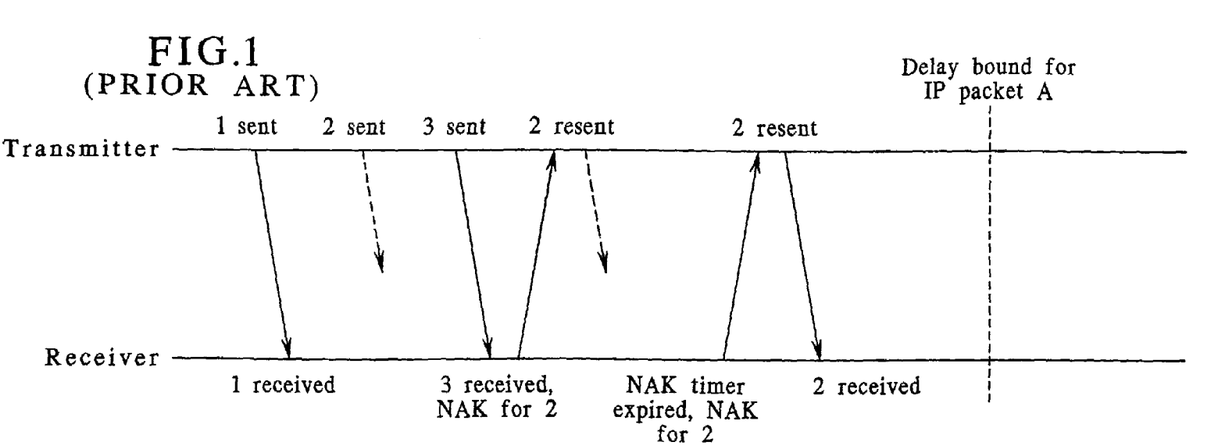
FIG. 1 is a timing diagram of one scenario of operation of a conventional NAK-based retransmission scheme in a communications system.

FIG. 1 illustrates one possible scenario for a conventional NAK-based retransmission scheme. Blocks 1, 2 and 3 all belong to the same IP packet (A). Block 1 is successfully transmitted to the receiver (indicated by the full arrow), but block 2 is lost during transmission (indicated by the shorter dashed arrow). When the receiver receives block 3, it is known that the receiver should, but does not, have a copy of block 2. At this point, the receiver sends an NAK message to the transmitter, requesting retransmission of block 2. A second copy of block 2 is then transmitted but it, too, is lost. However, the receiver started an NAK timer when it sent the original NAK message. In this case, since a valid copy of block 2 is not received before the timer expires, the receiver sends a follow-up NAK message to again request retransmission of block 2. The second attempt at resending block 2 is successful and the delay bound for IP packet A is satisfied.

Figure 2:
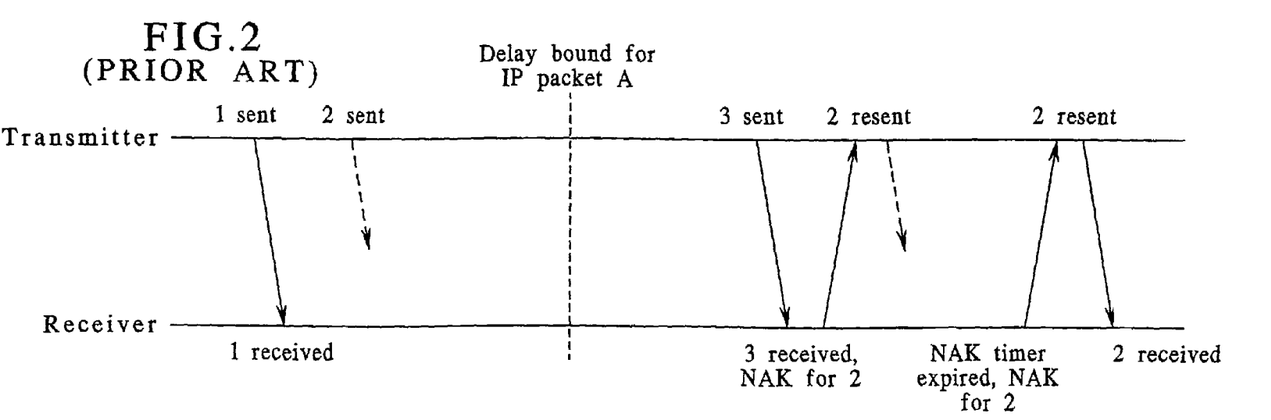
FIG. 2 is a timing diagram of another scenario of operation of a conventional NAK-based retransmission scheme in a communications system.

FIG. 2 illustrates another possible scenario for a conventional NAK-based retransmission scheme. In this case, blocks 1 and 2 belong to IP packet (A), while block 3 belongs to a later IP packet (B). Once again, block 1 is successfully transmitted to the receiver, but block 2 is lost. When the receiver receives block 3, it is known that block 2 is missing and the receiver performs the above-described NAK message procedure to request retransmission of the missing data. However, block 3 is received after the delay bound for packet A, so by the time the receiver requests retransmission of block 2, a QoS delay criterion for packet A will already have been violated.

The trend is such that future generation wireless systems will focus more on providing multimedia services (e.g., video conferencing, audio streaming, web browsing and voice communication), rather than just voice communication. For each type of service, there is a required QoS level, which may be defined in terms of acceptable error rate and acceptable transmission delay. For example, a voice service can tolerate a higher error rate, but requires a short transmission delay. Conversely, transferring a file requires a very low error rate, but a longer transmission delay can be tolerated. The RLP algorithm used at the MAC layer of the radio system should therefore guarantee a desired level of QoS on a best-effort basis.

The conventional, purely NAK-based retransmission scheme is not well suited for use when QoS transmission delay guarantees must be met. The RLP III algorithm does not guarantee a maximum allowable delay time, and therefore cannot reliably be used in a QoS-based communications system.

SUMMARY OF THE INVENTION

The present invention is concerned with a method of and an apparatus for improving communications over a network. The invention is particularly advantageous for use in a wireless network, and provides an RLP (Radio Link Protocol) algorithm that operates a transmitter and a receiver of the network in a manner to provide on-time delivery of transmitted data in order to satisfy specified QoS (Quality of Service) levels for various multimedia services. This is accomplished by ensuring that transmission of data packets from the transmitter to the receiver occurs within a specified delay bound for the data packets, so that no data packets or constituent parts of the data packets arrive at the receiver late. This prevents loss of data packets and preserves the integrity of the transmitted data.

In accordance with the invention, data blocks that are constituent parts of a data packet are transmitted from a transmitter to a receiver. To ensure that each data packet is correctly and timely received within a delay bound set for the data packet, the transmitter can send to the receiver one or more requests, if and as necessary, that operate the receiver to identify to the transmitter those data blocks that have been successfully received. The procedure is such that before the end of the delay bound, the transmitter will have retransmitted to the receiver any data block that had not been successfully received.

More particularly, upon sending each data block to the receiver, the transmitter starts an associated acknowledgement timer. If, before an acknowledgement timer expires, the transmitter receives information that the associated data block has been successfully received, the acknowledgement timer is cancelled. However, should an acknowledgement timer expire, the transmitter sends to the receiver an acknowledgement request signal that operates the receiver to send to the transmitter a message identifying successfully received data blocks, and simultaneously the transmitter sets an associated panic timer. Upon receipt of the requested message from the receiver, acknowledgement timers and any panic timers associated with data blocks identified as having been successfully received are cancelled. However, should a panic timer expire because the transmitter does not receive the message or because the transmitter is not otherwise informed that the associated data block was successfully received, it is assumed that the receiver did not successfully receive the associated data block. The transmitter then promptly retransmits one or more copies of the associated data block to the receiver, before occurrence of the delay bound set for the data packet.

The invention ensures that the entirety of the data packet is successfully received before a delay bound set for the data packet, and thereby ensures that a specified QoS level for a particular type of multimedia service is satisfied.

The foregoing and other advantages and features of the invention will become apparent to those of ordinary skill in the art upon review of the following detailed description, when taken in conjunction with the accompanying drawings.

DETAILED DESCRIPTION

A conventional technique used in wireless or radio communications systems to request retransmission of corrupted or missing RLP (Radio Link Protocol) data block is for a receiver to send an NAK (Negative AcKnowledgement) message to a transmitter. For example, since RLP data blocks are sequentially identified with sequence numbers, assume that the receiver receives two successive RLP blocks, M and N. Normally, N should be equal to M+1 or, in other words, M=N−1, with the increment by 1 of the sequence number indicating that the received RLP blocks are properly adjacent. Now assume that N>M+1. Since the receiver expects the sequence numbers to increment by 1, it is inferred that RLP blocks M+1, . . . ,N−1 have been lost and need to be retransmitted. Under this circumstance, the receiver sends to the transmitter an NAK for each missing block, to request the transmitter to retransmit the missing data.

A problem exists when one or more RLP blocks are lost and the time gap between RLP blocks M and N is longer than the maximum allowable data packet delay bound set for the particular service being provided, which represents the time by which a transmitted data packet must be present at the receiver, or else its associated QoS (Quality of Service) criteria will have been violated. An example of how this might happen is when two RLP data blocks belong to two different IP (Internet Protocol) data packets, with the second IP packet arriving at the transmitter later than the first packet, as shown and previously described in connection with FIG. 2. In this situation, by the time the receiver receives the second RLP block N and determines that $N \neq M+1$, the delay bound of the missing blocks will have expired and a desired QoS (Quality of Service) level will not be fulfilled.

Figure 3:
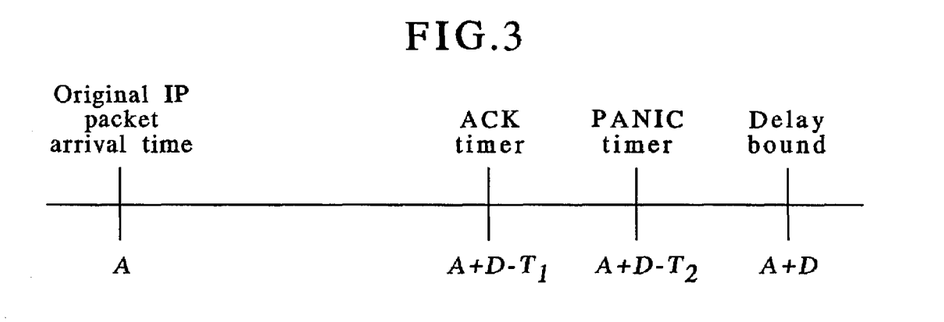
FIG. 3 shows a sequence of operation of timers of a transmitter of a communications system embodying the teachings of the present invention, upon arrival of an IP data packet at the transmitter.

To overcome this shortcoming, the invention provides a QoS-enabled RLP algorithm that substantially guarantees that a maximum delay bound set for IP data packet transmission will be satisfied. In accordance with a method of the invention, each RLP data block of an IP data packet arriving at a transmitter is identified with a sequential sequence number before being transmitted to a receiver. During transmission, the transmitter places a copy of each block in a retransmission buffer for use in case that particular block needs to be retransmitted. When each RLP block is transmitted, the transmitter starts an ACK (ACKnowledgement) timer associated with that block, as indicated in FIG. 3. This timer expires at a time $A+D-T_1$, where A is the arrival time at the transmitter of the IP packet from which the RLP block was obtained, D is the delay bound time, i.e., the maximum allowable delay time within the wireless system for the specific service being considered, and $T_1$ is a threshold value chosen to allow sufficient time to complete the RLP algorithm before the IP packet delivery time (delay bound) expires.

If an ACK timer expires because the transmitter is not timely informed by the receiver (as will be described) that a valid copy of the associated RLP block has been successfully received, then the transmitter does not know whether the RLP block successfully reached the receiver and attempts to determine whether that is the case. To make the determination, the transmitter sends an ACK REQ (ACKnowledgement REQuest) signal to the receiver. In response to receipt of the ACK REQ signal, the receiver transmits back, in an ACK message, the highest data block sequence number it has successfully received. When the transmitter sends the ACK REQ signal to the receiver, it also starts a Panic timer associated with the particular RLP block. The Panic timer has an expiry time of $A+D-T_2$, where $T_2$ is a threshold value lower than $T_1$ and is chosen to allow the transmitter sufficient time to transmit to the receiver last-chance copies of the RLP block before occurrence of the delay bound set for the IP data packet, should it prove necessary to do so. The values of the thresholds $T_1$ and $T_2$ are chosen so that $T_1-T_2$ allows sufficient time for the ACK REQ signal to be sent to the receiver, for the receiver to process the ACK REQ signal and for an ACK message to be sent back to the transmitter.

The transmitter turns off the Panic timer, before it otherwise expires, in response to timely receipt of an ACK message from the receiver, identifying the highest sequence number of RLP blocks successfully received, if such highest block sequence number indicates that the RLP block associated with the Panic timer has been successfully received. However, if the Panic timer is not turned off and instead expires, it is assumed that the receiver did not receive the associated RLP block. The transmitter then transmits to the receiver one or more copies of the RLP block as soon as possible, as determined by a scheduler at the transmitter and before the delay bound for the IP packet of which the RLP block is a constituent part. Multiple copies of the block advantageously are transmitted to reduce the probability of a valid copy of the RLP block not being successfully received at the receiver and the corresponding IP packet being lost, due to exceeding the maximum allowable delay time. In this connection, an IP data packet is lost if any of its constituent RLP data blocks is lost or delivered late.

At the receiver, the sequence numbers assigned to the received RLP blocks are used to reassemble the blocks in an order to reconstruct the original IP packets. If it is determined at the receiver that an RLP block is missing or corrupted, the receiver sends an NAK (Negative AcKnowledgement) message to the transmitter, identifying the RLP block the receiver requires. Upon receipt of the NAK message, the transmitter retransmits to the receiver one or more copies of that block. At the same time, since the NAK message also indirectly includes information identifying successfully received RLP blocks, the transmitter uses that information to cancel any associated ACK and Panic timers, since it is then known that the receiver is informed of the missing or corrupted block(s). This ACK/Panic timer cancellation procedure, from information contained in the NAK message, decreases the amount of messaging traffic that would otherwise occur.

When the receiver sends the NAK message to the transmitter, it starts an NAK timer associated with the missing or corrupted RLP block identified in the NAK message. Upon retransmission by the transmitter and successful arrival at the receiver of the requested RLP block, the receiver cancels the associated NAK timer. However, should the associated NAK timer not be timely turned off by the receiver and expire, that indicates that the required RLP block has not been received, perhaps because it was lost in retransmission or because the transmitter did not process the corresponding NAK message. In this situation, the receiver then sends multiple copies of the NAK message to the transmitter. There should be an upper limit on the maximum number of NAK messages sent for a specific RLP block.

The RLP algorithm of the invention is such that the transmitter cancels ACK and Panic timers for a corresponding RLP block M if one or both of the following conditions are met:

(1). An ACK signal containing sequence number N is received at the transmitter and $M \leq N$, since this indicates one of the following two conditions:
   (a). The receiver has successfully received a valid copy of the block M and does not require any retransmissions; or
   (b). The receiver does not have a valid version of block M, but knows that it should have received it, so will now use an NAK procedure to request retransmission.

(2). An NAK signal containing sequence number P is received at the transmitter and $M \leq +1$. An NAK for sequence number P indicates that the receiver terminal must have received at least the RLP block with sequence number P+1, since otherwise it would not know that P is missing. Consequently, even if the receiver does not have a valid copy of block M, it will know that it should have received it and will, therefore, use the NAK procedure to request retransmission.

If neither of the above two conditions causes the transmitter to cancel the ACK and Panic timers prior to their expiry, then the transmitter operates as previously described.

To decrease unnecessary messaging traffic, it is contemplated that an ACK message be periodically sent by the receiver to the transmitter to identify the highest sequence number of RLP data blocks received, i.e., the most recent RLP block received, thereby to inform the transmitter of which RLP blocks have been successfully received or are being handled by the NAK procedure. Upon receiving this information, the transmitter cancels the transmitter ACK and Panic timers corresponding to such RLP blocks. The periodic ACK message procedure thereby reduces total traffic over the wireless link by reducing the number of ACK REQ signals and ACK messages that must otherwise be sent.

However, periodic ACK messages are not sent during idle periods. When the receiver has acknowledged all of the RLP blocks that it has received and the transmitter goes idle, periodic ACK messages are suspended until more RLP blocks are received.

Figure 4:
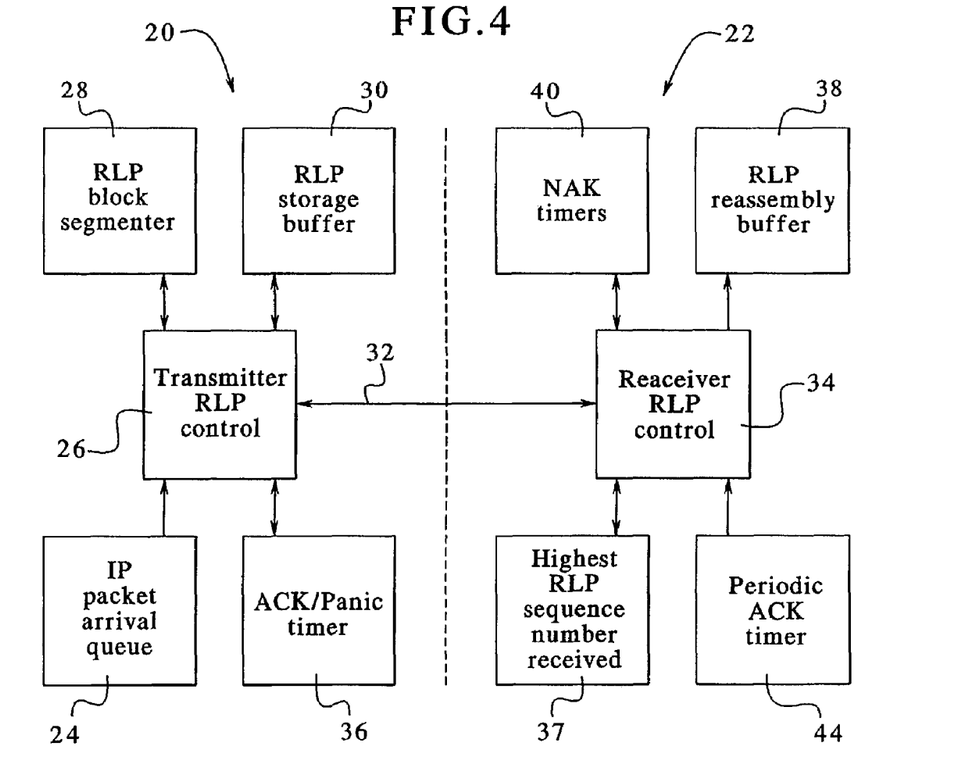
FIG. 4 is a block diagram illustrating relevant components of a transmitter and a receiver of a communications system embodying the teachings of the invention.

FIG. 4 shows a block diagram of relevant components of a communications system for implementing the algorithm of the invention. A transmitter of a wireless communications system, which may be a base station, is to the left of a vertical dashed line and indicated generally at 20. A receiver of the communications system, which may be a mobile or portable terminal, is to the right of the vertical dashed line and indicated generally at 22. In operation of the apparatus, IP data packets to be sent by the transmitter to the receiver arrive at an IP packet arrival queue circuit 24 of the transmitter. The IP packet arrival queue passes on the IP packets to a transmitter RLP control circuit 26. The transmitter RLP control circuit utilizes an RLP block segmenter circuit 28 to subdivide each IP packet into smaller RLP blocks as required, and then adds header and sequence number information to each block. A copy of each RLP block is retained in an RLP storage buffer circuit 30 in case any particular block(s) need to be retransmitted. The transmitter RLP control circuit then transmits each RLP block over a wireless interface 32 to a receiver RLP control circuit 34. At the same time that each RLP block is transmitted to the receiver, the transmitter RLP control module operates an ACK/Panic timer module circuit 36 to start an associated ACK timer.

Should an ACK timer of the ACK/Panic timer circuit 36 expire because the transmitter 20 is not timely informed by the receiver 22 that a valid copy of the associated RLP block has been successfully received, then the transmitter does not know whether the RLP block successfully reached the receiver and attempts to determine whether that is the case. To make the determination, upon expiration of the ACK timer, the transmitter RLP control circuit 26 transmits to the receiver an ACK REQ signal and simultaneously operates the ACK/Panic timer circuit to turn on an associated Panic timer. In response to receipt of the ACK REQ signal, the receiver transmits back, in an ACK message, the highest block sequence number it has successfully received up to the time of receipt of the ACK REQ signal, as obtained from a highest RLP sequence number received circuit 37. Upon receiving this ACK message, the transmitter turns off the associated Panic timer, if the message informs the transmitter that the associated RLP block has been successfully received. However, should the associated Panic timer expire because the transmitter does not timely receive a response to its ACK REQ signal, or because the ACK message does not identify the associated RLP block, then the transmitter RLP control circuit obtains from the transmitter RLP storage buffer 30 the RLP block associated with the expired Panic timer and transmits multiple copies of that block to the receiver. Transmitting multiple copies of the RLP block ensures that the receiver will successfully receive at least one copy of the block.

At the receiver 22, a receiver RLP reassembly buffer circuit 38 uses the sequence numbers assigned to received RLP blocks to reassemble the blocks in an order to reconstruct the original IP packets. If it is determined that an RLP block is missing or corrupted, the receiver RLP control circuit 34 sends an NAK message to the transmitter 20, identifying the missing or corrupted RLP block that the receiver requires. Upon receipt of the NAK message, the transmitter RLP control circuit 26 retrieves the required RLP block from the RLP storage buffer 30 and retransmits one or more copies of the block to the receiver. At the same time, the transmitter RLP control circuit uses the information provided by the NAK message to cancel any associated ACK and Panic timers of the ACK/Panic timer circuit 36, including timers associated with the requested block, since it is then known that the receiver is informed of the missing or corrupted block.

When the receiver 22 sends an NAK message to the transmitter 20, the receiver RLP control circuit 34 operates an NAK timers circuit 40 to turn on an NAK timer associated with the missing or corrupted RLP block identified in the NAK message. Upon retransmission by the transmitter and arrival at the receiver of the requested RLP block, the receiver RLP control circuit operates the receiver NAK timers circuit to turn off the associated NAK timer. However, should the associated NAK timer expire because it is not timely turned off, that indicates that the required RLP block has not been received, perhaps because it was lost in retransmission or as a result of the transmitter not processing the corresponding NAK message. In this situation, the receiver RLP control circuit sends multiple copies of the NAK message to the transmitter to ensure that the transmitter receives and responds to the message.

To decrease unnecessary messaging traffic over the network, it is contemplated that an ACK message be periodically sent by the receiver 22 to the transmitter 20 to inform the transmitter of which RLP blocks have been successfully received. In this connection, the receiver may embody a receiver periodic ACK timer circuit 44 that is operated by the receiver RLP control module 34 to periodically send an ACK message to the transmitter. The periodic ACK message informs the transmitter of the latest, i.e., the highest sequence number, RLP data block received, and therefore of which RLP blocks have been successfully received or are being handled via the NAK procedure. In response to the periodic ACK message, the transmitter cancels ACK and Panic timers corresponding to such RLP blocks. The periodic ACK message procedure reduces total traffic over the wireless link by reducing the number of ACK REQ signals and ACK messages that must otherwise be sent. Periodic ACK messages are not sent during idle periods when the receiver has acknowledged all of the RLP blocks that it has received and the transmitter goes idle. During such idle times, periodic ACK messages are suspended until more RLP blocks are received.

Figure 5:
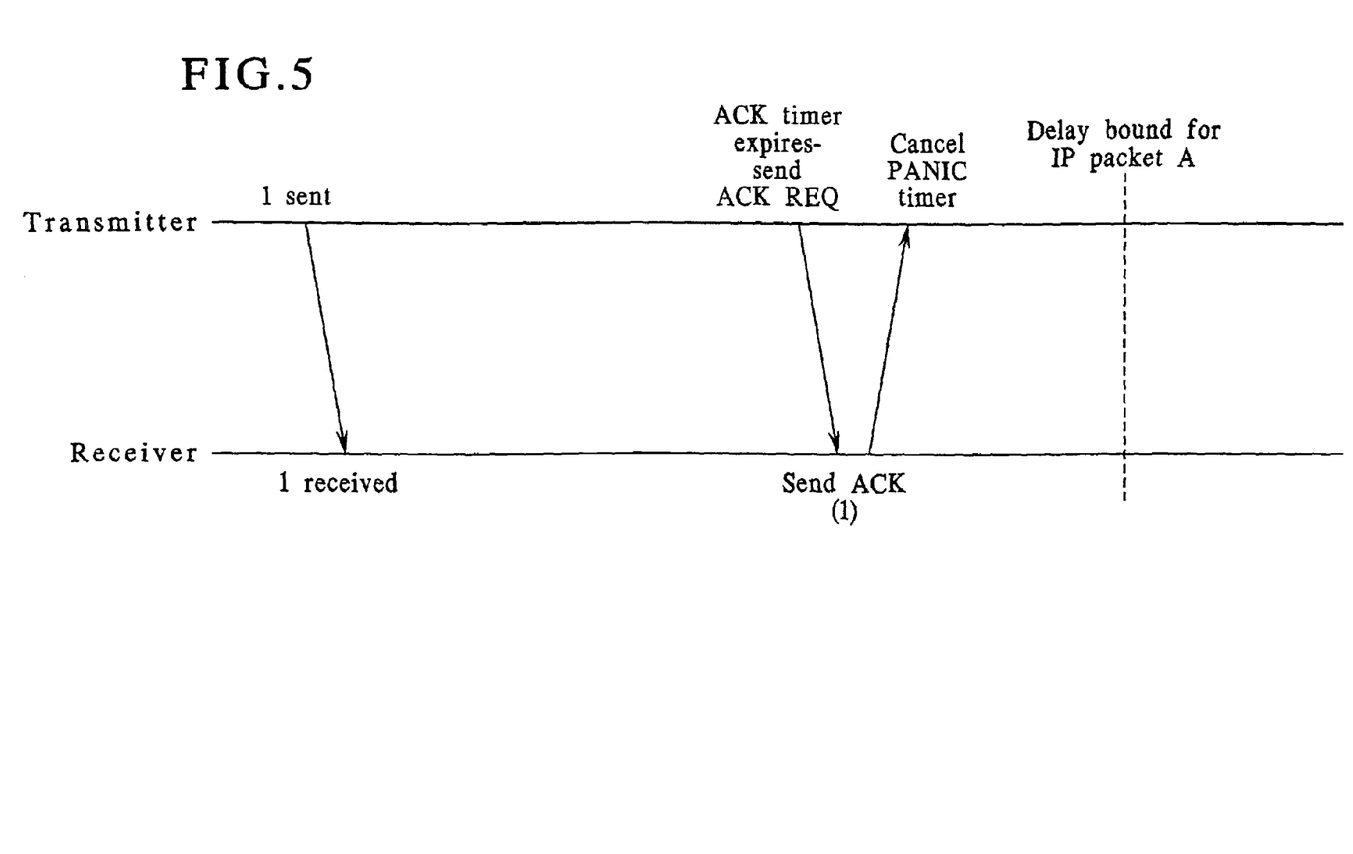
FIG. 5 is a timing diagram illustrating operation of an ACK timer of the transmitter.

FIG. 5 illustrates a use of an ACK timer of the transmitter ACK/Panic timer module 36. In this example, only one RLP block is considered, RLP block 1, which belongs to IP packet A. After the transmitter 20 sends RLP block 1 to the receiver 22, the transmitter does not receive an ACK or NAK message from the receiver regarding the block. The transmitter therefore cannot determine whether a valid copy of the block was successfully received. Eventually, the transmitter ACK timer associated with the block expires and causes the transmitter to send an ACK REQ signal to the receiver. In response to the ACK REQ signal, the receiver replies with an ACK message containing the highest block sequence number received by the receiver, as obtained from the highest RLP sequence number received circuit 37. If the highest RLP block sequence number is at least equal to that of RLP block 1, it is known that a valid copy of block 1 was either successfully received, or that it was not but will be handled by a NAK message, and the transmitter then cancels the corresponding Panic timer before it expires. This avoids the need to send additional unnecessary copies of RLP block 1 to the receiver.

Figure 6:
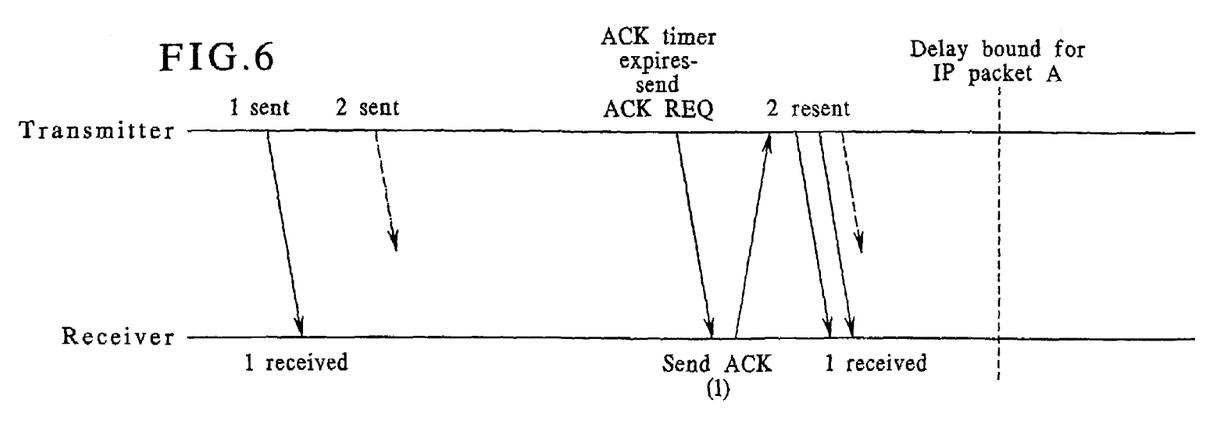
FIG. 6 is a timing diagram illustrating operation of the transmitter ACK timer when transmission of an RLP block to the receiver has failed.

FIG. 6 illustrates use of a transmitter ACK timer when a transmission of two RLP blocks to the receiver 22 fails to be successfully received. In this example, an IP data packet A is composed of RLP blocks 1 and 2. Block 1 is successfully transmitted, but block 2 is lost in transit. The first ACK timer to expire is for block 1, and an ACK REQ signal is sent by the transmitter 20 to the receiver. The receiver replies with an ACK message identifying the highest block sequence number received to date, which is RLP block 1. When the transmitter receives this ACK message, it is informed that block 2 was lost, in response to which it retransmits multiple copies of block 2, since there is insufficient time left for a further round of retransmission attempts. At the same time, the Panic timers for both blocks 1 and 2 are cancelled. As is seen, one of the retransmitted copies of RLP block 2 fails to reach the receiver, but the other copies are successfully received.

Figure 7:
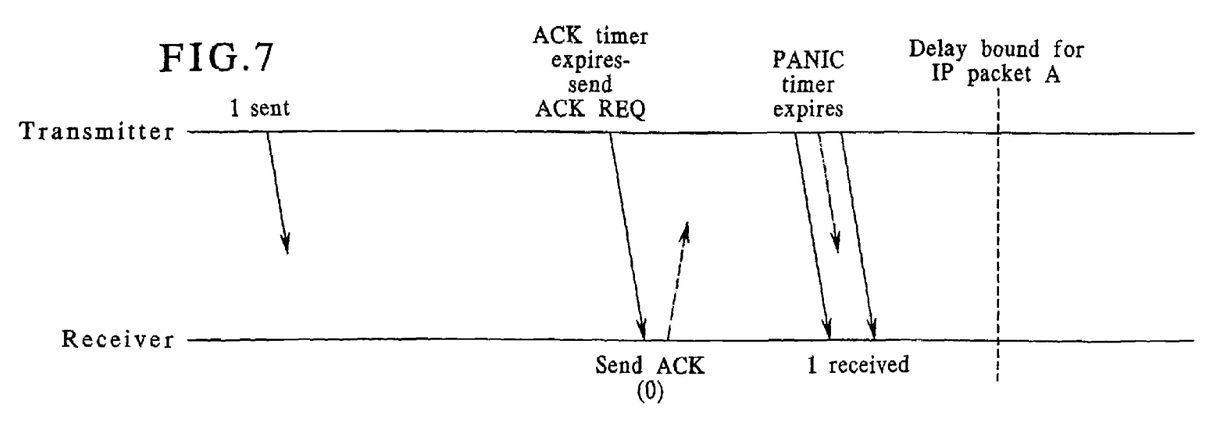
FIG. 7 is a timing diagram illustrating operation of ACK and Panic transmitter timers when the Panic timer expires.

FIG. 7 shows what happens when the transmitter 20 does not receive an ACK message from the receiver 22, as a result of which a Panic timer is allowed to expire. For simplicity, only one RLP block, block 1, is considered. Block 1 is transmitted, but is lost in transit. When the ACK timer for block 1 expires, the transmitter sends an ACK REQ signal to the receiver. The receiver replies with an ACK message containing the highest block sequence number received to date, which is 0, but this ACK message is lost and does not reach the transmitter. The Panic timer therefore expires, in response to which the transmitter sends multiple copies of RLP block 1 to the receiver to maximize the probability of it receiving at least one successful copy of that block. A similar situation occurs if the original ACK REQ message from the transmitter is lost, in which case the receiver would not send an ACK message and, again, the Panic timer would expire, resulting in multiple copies of the block being retransmitted.

Figure 8:
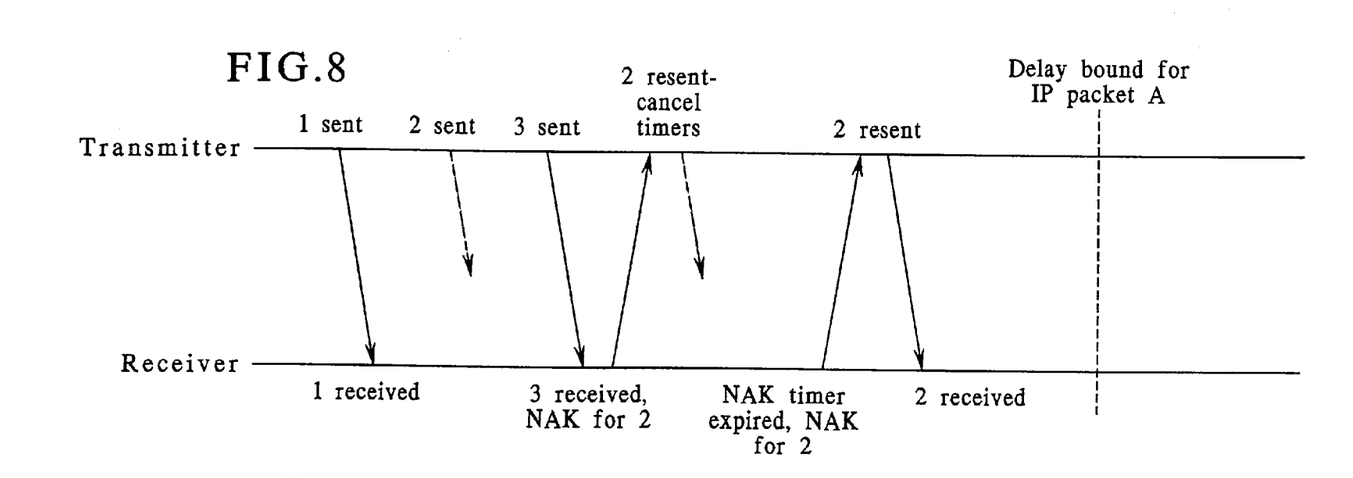
FIG. 8 is a timing diagram illustrating cancellation of transmitter ACK and Panic timers.

FIG. 8 illustrates a situation where the transmitter 20 cancels the ACK and Panic timers. Here, an IP packet A consists of three RLP blocks 1, 2 and 3. Block 2 is lost in transit, but block 3 is sent immediately following, so that the receiver 22 determines it is missing block 2 and requests retransmission of block 2 via an NAK message. When the transmitter receives the NAK message, it cancels the timers associated with all three blocks, since it is informed that a valid copy of RLP block 3 was successfully received, as otherwise the receiver would not know that it was missing block 2, and that any further retransmission of block 2 will be requested via the NAK message procedure. In this circumstance, it is more efficient to cancel the ACK and Panic timers to reduce the amount of signaling traffic that would otherwise result. As is seen, the first retransmission of block 2 fails to reach the receiver, as a result of which the receiver NAK timer expires and another NAK message is sent to the transmitter, requesting retransmission of block 2. The second retransmission of block 2 reaches the receiver.

Figure 9:
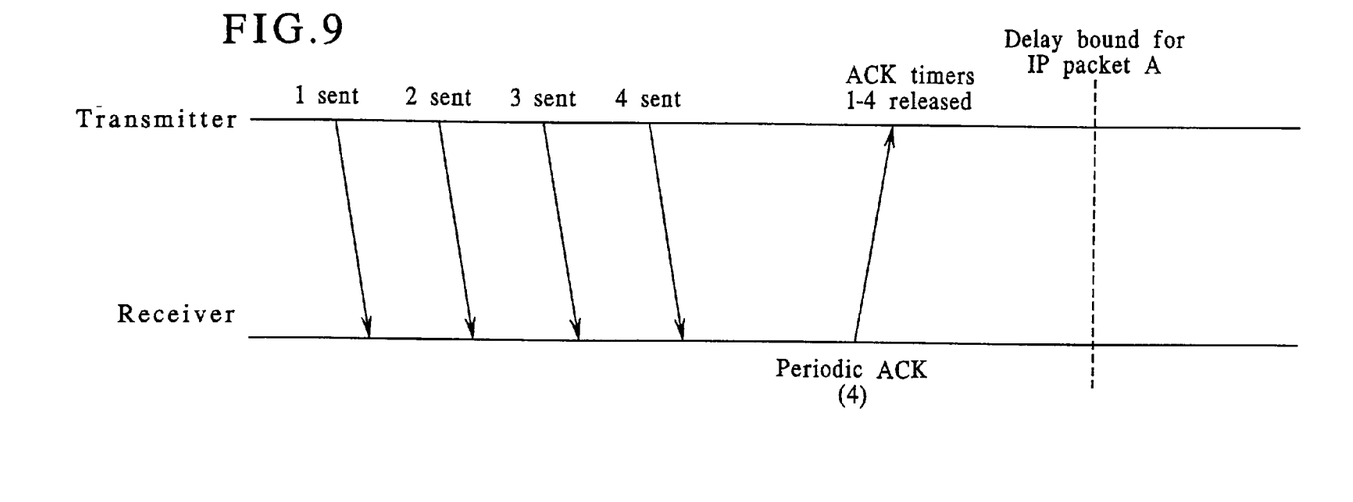
FIG. 9 is a timing diagram illustrating use of a periodic ACK signal from the receiver to reduce messaging traffic in the communications system.

FIG. 9 shows how transmission of a periodic ACK signal by the receiver 22, generated by the receiver periodic ACK timer circuit 44, reduces the overall amount of messaging traffic. In this example, RLP blocks 1, 2, 3 and 4 all belong to an IP packet A. All of the blocks are successfully received on the first transmission attempt. The receiver then sends its periodic ACK signal back to the transmitter 20, indicating that the most recent block sequence number received is for block 4. This informs the transmitter that valid copies of all four blocks were either successfully received or will be requested via the NAK procedure, allows the transmitter to release the ACK and Panic timers for all four RLP blocks, and eliminates the need for the transmitter to send any ACK REQ messages to the receiver.

Figure 10:
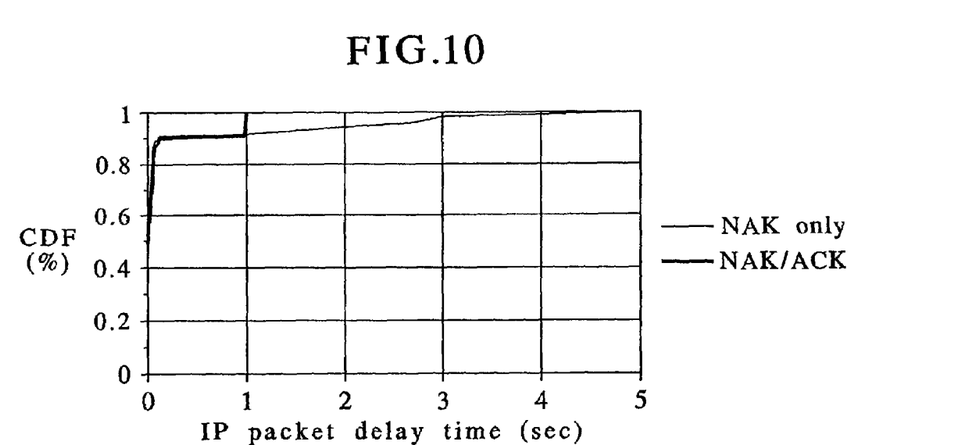
FIG. 10 is a graph of a CDF (Cumulative Distribution Function) of sample IP packet delay times for conventional NAK-based versus the proposed NAK/ACK-based retransmission with a 10% BLER (Block Error Rate)
Figure 11:
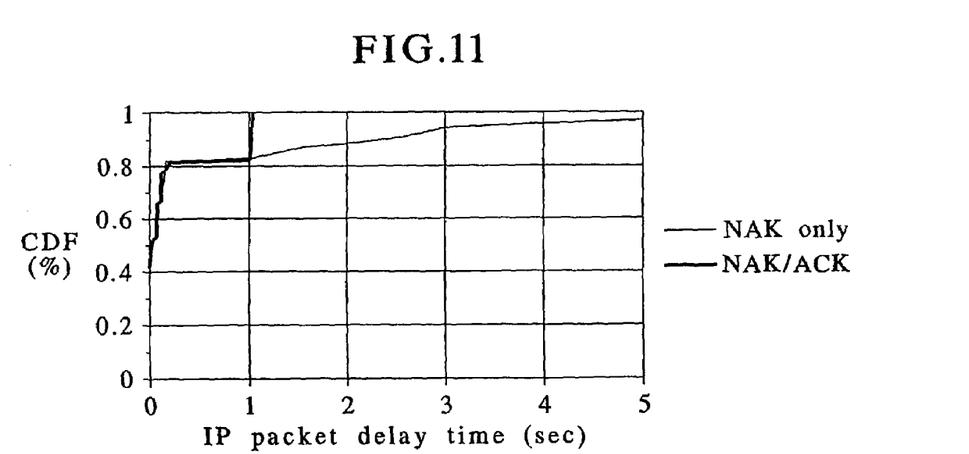
FIG. 11 is a graph of a CDF of sample IP packet delay times for conventional NAK-based versus the proposed NAK/ACK-based retransmission with a 20% BLER.

FIGS. 10 and 11 graphically illustrate performance statistics obtained from a MAC (Media Access Control) layer simulation of a wireless system using both an RLP algorithm embodying the teachings of the present invention and a conventional NAK-only algorithm. An FTP (File Transfer Protocol) service was used to provide sample data traffic. This type of traffic service is an example of a situation where there often is some spacing between successive IP packets. The desired delay bound was set at 1 second. The 10% and 20% BLER (BLock Error Rates) of respective FIGS. 10 and 11 represent error rates that might typically be experienced in a wireless data system. A high raw BLER significantly reduces the required amount of transmission power, and retransmissions by RLP are used to reduce the net visible BLER.

The graphs show observed IP packet delay CDF (Cumulative Distribution Function) curves for the two RLP algorithms. The RLP algorithm for the conventional NAK-only approach represents the previously discussed RLP III algorithm, whereas the RLP algorithm for the NAK/ACK approach is the new algorithm of the invention. It can be seen that while most IP packets experience a short delay, a significant percentage (roughly 10% and 18% for the respective 10% and 20% BLER values) experience a much longer delay. These represent situations where the receiver is not able to immediately identify that an RLP block has not been received or is corrupted. In the NAK-only algorithm, corrupted RLP blocks are not identified until the following RLP block has been received. This can often occur after a long delay, and IP packet delays of several seconds can result. This significantly exceeds the maximum delay bound of 1 second required for this QoS level. On the other hand, the NAK/ACK algorithm of the invention requests confirmation of successfully received RLP blocks and retransmits any missing or corrupted RLP blocks prior to the delay bound. The "step" jump immediately prior to the 1 second delay bound indicates the point in time at which the transmitter ACK timer expires, at which point the transmitter immediately requests confirmation from the receiver of missing RLP blocks and transmits them in sufficient time to meet the desired delay bound criterion.

The invention provides a method of and apparatus for implementing, in a communications system, an RLP algorithm that ensures on-time delivery of data in order to satisfy specified QoS levels. The invention utilizes acknowledgement requests, to the extent necessary, to ensure that transmitted data has been received at a receiver, and negative acknowledgements may be used to determine whether an acknowledgement request is actually needed. If the transmitter determines that the receiver did not receive a specific RLP data block within a specified time limit, or is unable to determine that the receiver received the RLP block, the transmitter retransmits one or more copies of the RLP data block to increase the probability of the receiver successfully obtaining an uncorrupted copy of the block. The unique application of signaling messages, such as acknowledgements, acknowledgement requests and negative acknowledgements, advantageously greatly increases the probability of meeting a specified time delay or delay bound criterion when delivering data in a wireless system.

While the invention has been described as being embodied in and implemented with a transmitter 20 and a receiver 22, it is understood that the terms "transmitter" and "receiver" have been used for the purpose of clarity and to better describe the primary functions performed by each device. In actuality each device is, must be, and is understood to be, a transceiver.

Also, while the method and apparatus of the invention are particularly advantageous for use in the environment of a wireless communications system, and therefore have been described in connection with such a system, it is understood that the RLP algorithm of the invention may also be used to insure on time delivery of IP data packets (or other forms of data packets) in a wire-line network communications system.

While embodiments of the invention have been described in detail, one skilled in the art thereof may devise various embodiments and other modifications thereof without departing from the spirit and scope of the invention, as defined by the appended claims.

What is claimed is:

1. An apparatus, comprising:
    means for transmitting data blocks to a receiver;
    means for receiving messages identifying successfully received data blocks;
    means for determining a time referenced to the transmission of the data block by the means for transmitting; and
    means for retransmitting a data block to the receiver in response to absence of receipt, within a predetermined time determined by the means for determining, of a message identifying the data block as having been successfully received,
    wherein said means for retransmitting includes:
    means responsive to absence of receipt by the end of a first interval of time, of a message that a data block has been successfully received, for transmitting to the receiver a request for a message identifying successfully received data blocks, and means responsive to continued absence of receipt by the end of a second and later interval of time, of a message that the data block has been successfully received, for retransmitting the data block to the receiver.

2. Apparatus as in claim 1, wherein the retransmitted data block is part of a data packet and said retransmitting means retransmits the data block before a delay bound set for the data.

3. Apparatus as in claim 1, wherein said first and second intervals of time are referenced to the time of transmission of the data block.

4. Apparatus as in claim 1, wherein:
    said first interval of time is referenced to the time of transmission to the receiver of the data block, and
    said second interval of time is referenced to the time of transmission to the receiver of the request for a message identifying successfully received data blocks.

5. Apparatus as in claim 4, wherein the data block is part of a data packet and said second interval of time ends before a delay bound set for the data packet.

6. Apparatus as in claim 5, wherein:
    said first interval of time expires at a time $A+D-T_1$, where A is the arrival time at said means for transmitting of the data packet, D is the delay bound time set for the data packet and $T_1$ is a threshold value, and
    said second interval of time expires at a time $A+D-T_2$, where $T_2$ is a threshold value lower then $T_1$.

7. Apparatus as in claim 1, wherein said transmitting means transmits to the receiver sequentially identified data blocks and said retransmitting means is inoperative to retransmit a data block M upon said receiving means receiving a message that either:
    data block N has been successfully received, and $M \leq N$, or
    date block P has been successfully received, and $M \leq P+1$.

8. Apparatus as in claim 1, further including:
    means for receiving negative acknowledgement messages from the receiver identifying data blocks that have not been successfully received, the negative acknowledgement messages including an identification of successfully received data blocks,
    said means for retransmitting being responsive to receipt of a negative acknowledgement message that a data block has not been successfully received to retransmit the data block to the receiver.

9. A transmitter, comprising:
    a transmitter circuit for transmitting data blocks to a receiver and for receiving from the receiver messages identifying successfully received data blocks; and
    a timer circuit for determining a time referenced to the transmission of the data block by the transmitter circuit, said transmitter circuit for retransmitting a data block to the receiver in response to absence of receipt from the receiver, by a time determined by said timer circuit, of a message identifying the data block as having been successfully received,
    wherein said transmitter circuit is:
    responsive to absence of receipt by the end of a first interval of time determined by said timer circuit, of a message from the receiver that a data block has been successfully received, to transmit to the receiver a request for a message identifying successfully received data blocks, and is
    responsive to continued absence of receipt by the end of a second and later interval of time determined by said timer circuit, of a message from the receiver that the data block has been successfully received, to retransmit the data block to the receiver.

10. A transmitter as in claim 9, wherein said first and second intervals of time are referenced to the time of transmission to the receiver of the data block.

11. A transmitter as in claim 9, wherein:
    said first interval of time is referenced to the time of transmission to the receiver of the data block, and
    said second interval of time is referenced to the time of transmission to the receiver of the request for a message identifying successfully received data blocks.

12. A transmitter as in claim 11, wherein the data block is part of a data packet and said second interval of time ends before a delay bound set for the data packet.

13. A transmitter us in claim 12, wherein:
    said first interval of time expires at a time $A+D-T_1$, where A is the arrival time of the data packet at said transmitter control circuit, D is the delay bound time set for the data packet and $T_1$ is a threshold value, and
    said second interval of time expires at a time $A+D-T_2$, where $T_2$ is a threshold value lower than $T_1$.

14. A transmitter as in claim 9, wherein said transmitter circuit transmits sequentially identified data blocks, and is inoperative to retransmit a data block M upon receiving from the receiver a message that either:
    data block N has been successfully received, and $M \leq N$, or
    data block P has been successfully received, and $M \leq P+1$.

15. A transmitter as in claim 9, wherein said transmitter circuit is responsive to receipt from the receiver of negative acknowledgement messages identifying data blocks that have not been successfully received, to retransmit the identified data blocks to the receiver, the negative acknowledgement messages including identifications of successfully received data blocks.

16. A transmitter as in claim 9, further comprising:
a data block storage buffer for storing copies of transmitted data blocks, said transmitter circuit obtaining, from said data block storage buffer, data blocks for retransmission.

17. A transmitter as in claim 9, wherein said transmitter circuit, upon transmission of each data block to the receiver, controls said timer circuit to start an acknowledgement timer associated with the transmitted data block.

18. A transmitter as in claim 17, wherein said transmitter circuit in response to receipt before expiry of an acknowledgement timer of a message from the receiver that the associated data block has been successfully received, controls said timer circuit to cancel the acknowledgement timer.

19. A transmitter as in claim 18, wherein said transmitter circuit, in the absence of receipt before expiry of an acknowledgement timer of a message from the receiver that the associated data block has been successfully received, transmits to the receiver a request for a message identifying successfully received data blocks and controls said timer circuit to start an associated panic timer.

20. A transmitter as in claim 19, wherein said transmitter circuit in response to receipt before expiry of a panic timer of a message from the receiver that the associated data block has been successfully received controls said timer circuit to cancel the panic timer.

21. A transmitter as in claim 20, wherein said transmitter circuit, in the absence of receipt before expiry of a panic timer of a message from the receiver that the associated data block has been successfully received, retransmits the associated data block to the receiver.

22. Apparatus for transmitting date over a network, comprising:
a transmitter for transmitting data blocks;
a receiver for receiving the transmitted data blocks, said receiver being operable to send to said transmitter messages identifying successfully received data blocks; and
a timer for determining a time referenced to the transmission of the data block by the transmitter, said transmitter retransmitting a data block to the receiver in response to absence of receipt by said transmitter, by a time determined by said timer, of a message from said receiver identifying the data block as having been successfully received,
wherein said transmitter includes:
a transmitter control circuit; and
a timer circuit,
said transmitter control circuit being responsive to absence of receipt by the end of a first interval of time determined by said timer circuit, of a message from said receiver that a data block has been successfully received, to transmit to the receiver a request for a message identifying successfully received data blocks, and being responsive to continued absence of receipt by the end of a second and later interval of time determined by said timer circuit, of a message from said receiver that the data block has been successfully received, to retransmit the data block to said receiver.

23. Apparatus as in claim 22, wherein said transmitter includes:
a transmitter control circuit; and
a data black storage buffer far storing copies of transmitted data blocks, said transmitter control circuit obtaining from said data block storage buffer data blocks for retransmission to said receiver.

24. Apparatus as in claim 22, wherein said first and second time intervals are referenced to the time of transmission by said transmitter to said receiver of the data block.

25. Apparatus as in claim 22, wherein said first time interval is referenced to the time of transmission by said transmitter to said receiver of the data block, and said second time interval is referenced to the time of transmission by said transmitter to said receiver of the request for the message identifying successfully received data blocks.

26. Apparatus as in claim 22, wherein the data block is part of a data packet and said second interval of time ends before a delay bound set for the data packet.

27. Apparatus as in claim 26, wherein:
said first interval of time expires at a time $A+D-T_1$, where A is the arrival time of the data packet at said transmitter, D is the delay bound time set for the data packet and $T_1$ is a threshold value, and
said second interval of time expires at a time $A+D-T_2$, where $T_2$ is a threshold value lower than $T_1$.

28. Apparatus as in claim 22, wherein said transmitter transmits to said receiver sequentially identified data blocks, and is inoperative to retransmit a data block M upon receiving from said receiver a message that either:
data block N has been successfully received, and $M \leq N$, or
data block P has been successfully received, and $M \leq P+1$.

29. Apparatus as in claim 22, wherein said transmitter is responsive to receipt from said receiver of negative acknowledgement messages identifying data blacks that have not been successfully received, to retransmit the data blocks to said receiver, the negative acknowledgement messages including identifications of successfully received data blocks.

30. Apparatus as in claim 22, wherein said transmitter includes:
a timer circuit,
said transmitter, in response to transmission of each data block to said receiver, controlling said timer circuit to start an acknowledgement timer associated with the transmitted data block.

31. Apparatus as in claim 30, wherein said transmitter, in response to receipt before expiry of an acknowledgement timer of a message from said receiver that the associated data block has been successfully received, controls said timer circuit to cancel the acknowledgement timer.

32. Apparatus as in claim 31, wherein said transmitter, in the absence of receipt before expiry of an acknowledgement timer of a message from said receiver that the associated data block has been successfully received, transmits to said receiver a request for a message identifying successfully received data blocks, and controls said timer circuit to start an associated panic timer.

33. Apparatus as in claim 32, wherein said transmitter, in response to receipt before expiry of a panic timer of a message from said receiver that the associated data block has been successfully received, controls said timer circuit to cancel the panic timer.

34. Apparatus as in claim 33, wherein said transmitter, in the absence of receipt before expiry of a panic timer of a message from said receiver that the associated data block has been successfully received, retransmits the associated data block to said receiver.

35. Apparatus as in claim 22, wherein said transmitter transmits sequentially identified data blocks to said receiver and said receiver, in the messages sent to said transmitter identifying successfully received data blocks, identifies the most recent data block received.

36. Apparatus as in claim 35, wherein said receiver periodically sends to said transmitter a message identifying the most recent data block received.

37. Apparatus as in claim 22, wherein:
said receiver sends to said transmitter negative acknowledgement messages identifying data blocks that said receiver has not successfully received, and
said transmitter is responsive to receipt of a negative acknowledgement message to retransmit to said receiver the data block identified as not having been successfully received,
the negative acknowledgement messages including identifications of successfully received data blocks.

38. A method, comprising:
transmitting data blocks to a receiver;
receiving from the receiver messages identifying successfully received data blocks;
determining a time referenced to the transmission of the data block by the step of transmitting;
retransmitting a data block to the receiver in response to absence of receipt by a predetermined time determined by the step of time reference determination, of a message from the receiver identifying the data block as having been successfully received; and
sending to the receiver, in response to absence of receipt by the end of a first interval of time of a message from the receiver identifying a data block as having been successfully received, a request for a message identifying successfully received data blocks,
wherein said retransmitting step is responsive to continued absence of receipt by the end of a second and later interval of time, of a message from the receiver that the data block has been successfully received, to retransmit the data block to the receiver.

39. A method as in claim 38, wherein the data block is part of a data packet and said retransmitting step retransmits the data block before a delay bound set for the data packet.

40. A method as in claim 38, wherein the first time interval is referenced to the time of performance of said transmitting step for the date block end the second time interval is referenced to the time of performance of said sending step for the data block.

41. A transmitter as in claim 40, wherein:
the first interval of time expires at a time $A+D-T_1$, where A is the arrival time of the data packet for transmission by said transmitting step, D is the delay bound time set for the data packet and $T_1$ is a threshold value, and
the second interval of time expires at a time $A+D-T_2$, where $T_2$ is a threshold value lower than $T_1$.

42. A method as in claim 40, wherein the data block is part of a data packet and the second time interval ends before a delay bound set for the data packet.

43. A method as in claim 38, including the steps of:
receiving from the receiver negative acknowledgement messages identifying date blocks that have not been successfully received; and
retransmitting the identified data blocks to the receiver in response to receipt of the negative acknowledgement messages, and wherein
the negative acknowledgement messages include identifications of successfully received data blocks.

44. A method as in claim 38, including the step of:
separating data packets into data blocks, and wherein said transmitting step transmits the data blocks sequentially.

45. A method as in claim 38, including the step of:
storing copies of transmitted data blocks, and wherein said retransmitting step includes obtaining a stored copy of a data block for retransmission.

46. A method as in claim 38, including the step of:
starting, upon each performance of said transmitting step, an acknowledgement timer associated with the transmitted data block.

47. A method as in claim 46, including the step of:
canceling an acknowledgment timer in response to receipt, before expiry of the acknowledgment timer, of a message from the receiver that the associated data block has been successfully received.

48. A method as in claim 47, including the steps of:
sending to the receiver, in response to expiration of an acknowledgement timer in the absence of receipt before expiry of the acknowledgement timer of a message from the receiver that the associated data block has been successfully received, a request for a message identifying successfully received data blocks, and
starting a panic timer associated with the data block.

49. A method as in claim 48, including the step of:
canceling a panic timer associated with a data block in response to receipt, before expiry of the panic timer, of a message from the receiver identifying the data block as having been successfully received.

50. A method ma in claim 48, including the step of:
retransmitting, to receipt before expiry of a panic timer of a message from the receiver that the associated data block has been successfully received, the associated data block to the receiver.

51. A method as in claim 38, including the step of:
periodically sending from the receiver to the transmitter messages identifying successfully received data blocks.

52. A method as in claim 38, wherein said transmitting step transmits sequentially identified data blocks, and said retransmitting step is inoperative to retransmit a data block M upon receiving a message that either:
data block N has been successfully received, and $M \leq N$, or
data block P has been successfully received, and $M \leq P+1$.

53. A method, comprising:
transmitting data blocks from transmitter to a receiver;
sending messages from the receiver to the transmitter identifying successfully received data blocks;
determining a time referenced to the transmission of the data block by the step of transmitting;
retransmitting a data block to the receiver in response to absence of receipt at the transmitter, by a predetermined time determined by the step of time reference determination, of a message from the receiver identifying the date block as having been successfully received; and
sending to the receiver, in response to absence of receipt by the end of a first interval of time of a message from the receiver identifying a data block as having been successfully received, a request for a message identifying successfully received data blocks,
wherein said retransmitting step is responsive to continued absence of receipt by the end of a second and later interval of time, of a message from the receiver that the data block has been successfully received, to retransmit the data block to the receiver.

54. A method as in claim 53, wherein the data blocks are constituent part of data packets and the predetermined time is shorter than a delay bound set for the data packets.

55. A method as in claim 53, including the step of: storing copies of transmitted data blocks, and wherein said retransmitting step obtains a stored copy of a data block for retransmission.

56. A method as in claim 53, wherein the first and second time intervals are referenced to the time of performance of said transmitting step for the data block.

57. A method as in claim 53, wherein the first time interval begins with performance of said transmitting step for the data block, and the second time interval begins with performance of said sending step for the data block.

58. A method as in claim 53, wherein the data block is part of a data packet and the second time interval ends before a delay bound set for the data packet.

59. A method as in claim 53, including the steps of:
sending from the receiver to the transmitter negative acknowledgement messages identifying data blocks that have not been successfully received; and
retransmitting the identified data blocks from the transmitter to the receiver in response to receipt of the negative acknowledgement messages, and wherein
the negative acknowledgement messages include identifications of successfully received data blocks.

60. A method as in claim 53, including the step of:
starting, upon each performance of said transmitting step, an acknowledgement timer associated with the transmitted data block.

61. A method as in claim 60, including the step of:
canceling an acknowledgment timer in response to receipt, before expiry of the acknowledgment timer, of a message from the receiver that the associated data block has been successfully received.

62. A method as in claim 61, including the steps of:
sending to the receiver, in response to expiration of an acknowledgement timer in the absence of receipt before expiry of the acknowledgement timer of a message from the receiver that the associated data block has been successfully received, a request for a message identifying successfully received data blocks, and
starting a panic timer associated with the data block.

63. A method as in claim 62, including the step of:
canceling a panic timer associated with a data block in response to receipt, before expiry of the panic timer, of a message from the receiver identifying the data block as having been successfully received.

64. A method as in claim 63, including the step of:
retransmitting, in response to expiry of a panic timer, the associated data block to the receiver.

65. A method as in claim 53, including the step of:
periodically sending from the receiver to the transmitter an identification of successfully received data blocks.

66. A method as in claim 53, including the steps of:
sequentially identifying data blocks transmitted to the receiver, and
periodically sending from the receiver to the transmitter an acknowledgement message identifying the most recent data block received.

67. A method as in claim 53, wherein:
said sending step includes sending from the receiver to the transmitter negative acknowledgement messages identifying data blocks that have not been successfully received, and
said retransmitting step includes retransmitting the identified data blocks.

68. A method as in claim 67, including the steps of:
setting a negative acknowledgement timer in response to sending a negative acknowledgement message from the receiver to the transmitter, and
resending the negative acknowledgement message from the receiver to the transmitter in the absence of receiving at the receiver, by the time of expiry of the negative acknowledgement timer, a retransmission of the identified data block.

69. A method as in claim 53, wherein:
the first interval at time expires at a time $A+D-T_1$, where A is the arrival time of the data packet for transmission by said transmitting step, D is the delay bound time set for the data packet and $T_1$ is a threshold value, and
the second interval of time expires at a time $A+D-T_2$, where $T_2$ is a threshold value lower than $T_1$.

70. A method as in claim 53, wherein said transmitting step transmits date blocks that are sequentially identified, and maid retransmitting step is inoperative to retransmit a data block Ad upon receiving a message that either:
data block N has been successfully received, and $M \leq N$, or
data block P has been successfully received, and $M \leq P+1$.

* * * * *

UNITED STATES PATENT AND TRADEMARK OFFICE
CERTIFICATE OF CORRECTION

PATENT NO. : 7,058,085 B2 Page 1 of 1
APPLICATION NO. : 09/805958
DATED : June 6, 2006
INVENTOR(S) : Mark Earnshaw et al.

It is certified that error appears in the above-identified patent and that said Letters Patent is hereby corrected as shown below:

Column 11, line 62 (claim 6), delete "then" and insert therefor --than--;

Column 13, line 35 (claim 22) delete "date" and insert therefor --data--;

Column 14, line 31 (claim 29), delete "blacks" and insert therefor --blocks--;

Column 15, line 42 (claim 40), delete "...date block end" and insert therefor --data block and--;

Column 16, line 11 (claim 47), delete "acknowledgment" and insert therefor --acknowledgement--;

Column 16, lines 28 (claim 50), delete "method ma" and insert therefor --method as--;

Column 18, line 38 (claim 70), delete "date" and insert therfor --data--

Column 18, line 39 (claim 70), delete "maid" and insert therefor "said"; and

Column 18, line 40 (claim 70), delete "Ad" and insert therefor --M--.

Signed and Sealed this

Seventeenth Day of October, 2006

JON W. DUDAS
*Director of the United States Patent and Trademark Office*